(12) United States Patent
Batra et al.

(10) Patent No.: US 8,725,592 B2
(45) Date of Patent: May 13, 2014

(54) METHOD, SYSTEM, AND MEDIUM FOR RECOMMENDING GIFT PRODUCTS BASED ON TEXTUAL INFORMATION OF A SELECTED USER

(75) Inventors: Arvind Batra, San Bruno, CA (US); Madhusudan Mathihalli, San Bruno, CA (US); Indrani Chakravarty, Sunnyvale, CA (US); Digvijay Singh Lamba, San Bruno, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 273 days.

(21) Appl. No.: 13/300,473

(22) Filed: Nov. 18, 2011

(65) Prior Publication Data

US 2012/0197750 A1    Aug. 2, 2012

Related U.S. Application Data

(60) Provisional application No. 61/415,282, filed on Nov. 18, 2010, provisional application No. 61/415,279, filed on Nov. 18, 2010.

(51) Int. Cl.
*G06Q 30/00* (2012.01)

(52) U.S. Cl.
USPC ........... 705/26.7; 705/319; 707/736; 707/755

(58) Field of Classification Search
CPC ............... G06Q 30/0631; G06Q 50/01; G06F 17/20–17/21; G06F 17/27–17/28; G06F 17/30; G06F 17/3061

USPC ........ 705/26.1–27.2, 319; 707/602–603, 607, 707/732, 736, 755
See application file for complete search history.

(56) References Cited

U.S. PATENT DOCUMENTS

| | | | |
|---|---|---|---|
| 8,122,020 B1 * | 2/2012 | Donsbach et al. ............ 707/732 |
| 2004/0167909 A1 | 8/2004 | Wakefield et al. | |
| 2009/0182779 A1 | 7/2009 | Johnson | |
| 2009/0234712 A1 * | 9/2009 | Kolawa et al. .................. 705/10 |
| 2010/0169160 A1 * | 7/2010 | Wu et al. ........................ 705/10 |
| 2010/0198777 A1 | 8/2010 | Lo et al. | |

OTHER PUBLICATIONS

Snowsill, Tristan, et al., "Finding Surprising Patterns in Textual Data Streams", Cognitive Information Processing (CIP), 2010 2nd International Workshop on, IEEE, Piscataway, NJ, dated Jun. 14, 2010.
International Search Report issued in International Application No. PCT/US2011/061547, dated Mar. 6, 2012 (5 pages).

* cited by examiner

*Primary Examiner* — William Allen
(74) *Attorney, Agent, or Firm* — David R. Stevens; Stevens Law Group

(57) ABSTRACT

Exemplary embodiments provide methods, systems and devices for recommending one or more products for a selected individual. The products may be recommended to a user for gifting to the selected individual. Exemplary embodiments may automatically determine one or more topics of interest to the selected individual. In an exemplary embodiment, semantic analysis may be performed on textual content associated with the selected individual to automatically extract the topics of interest. Exemplary embodiments may use the topics of interest to automatically determine one or more products that are likely to be of interest to the selected individual.

21 Claims, 10 Drawing Sheets

Mary B — 302
@MaryDenise Maryland,USA
Interests: — 304
Categories: Music, Travel, TV, Politics
Topics: Lady Gaga, Philippines, Amazing Race, Anderson Cooper
Web Sites: CNN, Facebook — 308
} — 306
Recent: Planning a Trip to China and Mongolia — 310
Recommend:
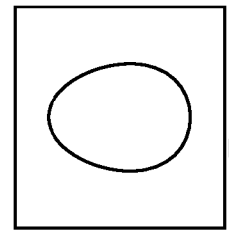
312
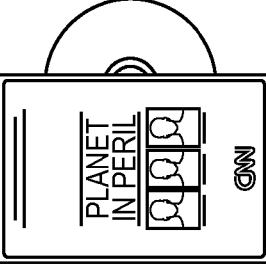
314
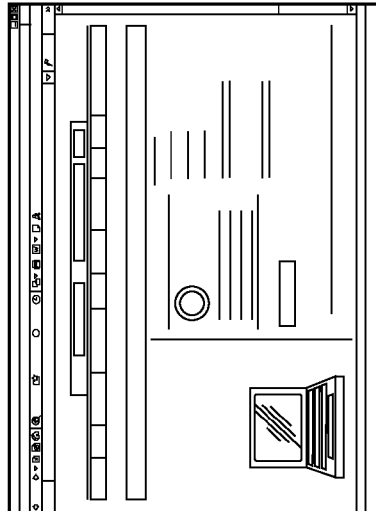
316
Lingo World Traveler - 44
Language Translater
Order Online
$104.95
300
*Fig. 3*

```
{
  - recommendations: [                              - walmartCategoryLineage: [
    - {                                               - {
        - pr_attributes: {                                catId: "WC:4104"
702 ———— gender_type: "unisex",                       },
706 ———— ag_type: "ag:adult"                          - {
        },                                                catId: "WC:4112"
        walmart_canonical_url: "/ip/2315741",         },
        bucket_type: "bt_interest",                   - {
        wm_item_num: "0002521890202",                     catId: "WC:5408"
710 ———— base_item_price: "9",                        },
        affinity: 2.16,                               - {
712 ———— mp_seller_name: "Walmart.com",                   catId: "WC:25260"
        b_score: 615229.147287151,                    }
716 ———— customer_rating: "0",                      ],
        trending_score: -0.105637604258845, ⟍       - product_reason_info: {
702 ———— id: 2315741,                        ⟍720     - interests: {
        product_is_giftable: true, ———— 718               derived-values: [ ],
        id_str: "wmtp_2315741",                           - values: [
714 ———— descr: "",                                         - {
708 ———— canonical_url: "www.walmart.com/ip/2315741",           catId: "cat:7955573",
        - pCats: [                                              catName: "John Coltrane"
            "cat:7954093",                                  }
            "cat:8002510",                              ]
            "cat:8002509",                            },
            "cat:8001894",                            - age_group_match: {
            "cat:6662983",                                value: "ag:adult"
            "cat:7775978",                            },
            "cat:8344257",                            - evidence: {
            "cat:8344337",                              - from_entity: {
        ],                                                  fb:id: "fb:like:1041742796201144"
                                                            fb:category: "Musician/band",
                                                            -
                                                        }
                                                      },
                                                      image_url: http://i.walmartimages.com/i/p/00/02/52/18/90
                                                      /0002521890202_180X180.jpg ,
                                                      title: "John Coltraine Plays For Lovers (Remaster)",
                                                      price: "11.88",
                                                      rank: 0.0796466275540695
                                                    },
```

*Fig. 7*

METHOD, SYSTEM, AND MEDIUM FOR RECOMMENDING GIFT PRODUCTS BASED ON TEXTUAL INFORMATION OF A SELECTED USER

RELATED APPLICATIONS

This application is a non-provisional of and claims priority to U.S. Provisional Patent Application No. 61/415,282 entitled "Managing Real-Time Data Streams," filed Nov. 18, 2010, and U.S. Provisional Patent Application No. 61/415,279 entitled "Social Genome," filed Nov. 18, 2010. This application also relates to U.S. Provisional Patent Application No. 61/345,252 entitled "Content Feed," filed May 17, 2010, U.S. patent application Ser. No. 13/106,706 entitled "Processing Data Feeds," filed May 12, 2011, a U.S. non-provisional patent application 13/300,524 titled "Processing Data Feeds," filed Nov. 18, 2011, a U.S. non-provisional patent application Ser. No. 13/300,523 titled "Real-Time Analytics of Streaming Data," filed Nov. 18, 2011, and a U.S. non-provisional patent application Ser. No. 13/300,519 titled "Social Genome," filed Nov. 18, 2011. The entire contents of each of the above-referenced applications are incorporated herein in their entirety by reference.

SUMMARY

In accordance with one exemplary embodiment, a computer-implemented method is provided for recommending one or more gifts for a selected individual. The method includes receiving textual content associated with the selected individual, forwarding the textual content to a semantic analysis engine programmed to perform semantic analysis of the textual content in order to transform the textual content into one or more topic categories of interest to the selected individual associated with the textual content, and receiving the one or more topic categories of interest from the semantic analysis engine. The method also includes automatically executing, on a computing device, computer-executable code associated with a product lookup module and programmed to determine one or more products corresponding to the one or more topic categories of interest that are giftable. The method also includes recommending the one or more giftable products as gifts for the selected individual.

In accordance with another exemplary embodiment, a computational system is provided. The computational system includes a network communication device configured to receive textual content associated with a selected individual, forward the textual content to a semantic analysis engine programmed to perform semantic analysis of the textual content in order to transform the textual content into one or more topic categories of interest to the selected individual associated with the textual content, and receive the one or more topic categories of interest from the semantic analysis engine. The computational system also includes a computer-readable storage device for storing computer-executable code associated with a product lookup module and programmed to determine one or more products corresponding to the one or more topic categories of interest that are giftable. The computational system also includes a processor programmed to automatically execute the computer-executable code associated with the product lookup module to recommend, as gifts for the selected individual, the one or more products corresponding to the one or more topic categories of interest that are giftable.

In accordance with another exemplary embodiment, one or more computer-readable media are provided having encoded thereon computer-executable instructions for performing a method for recommending one or more gifts for a selected individual. The method includes receiving textual content associated with the selected individual, forwarding the textual content to a semantic analysis engine programmed to perform semantic analysis of the textual content in order to transform the textual content into one or more topic categories of interest to the selected individual associated with the textual content, and receiving the one or more topic categories of interest from the semantic analysis engine. The method also includes automatically executing, on a computing device, computer-executable code associated with a product lookup module and programmed to determine one or more products corresponding to the one or more topic categories of interest that are giftable. The method also includes recommending the one or more giftable products as gifts for the selected individual.

BRIEF DESCRIPTION OF THE DRAWINGS

The foregoing and other objects, aspects, features and advantages of exemplary embodiments will be more fully understood from the following description when read together with the accompanying drawings, in which:

FIG. 3 illustrates an exemplary collection of information on a selected individual "Mary B" and products recommended for the individual based on her interests.

FIG. 7 illustrates an exemplary data structure formatted in the JavaScript Object Notation (JSON) standard for providing information on an exemplary product

DETAILED DESCRIPTION

Figure 1:
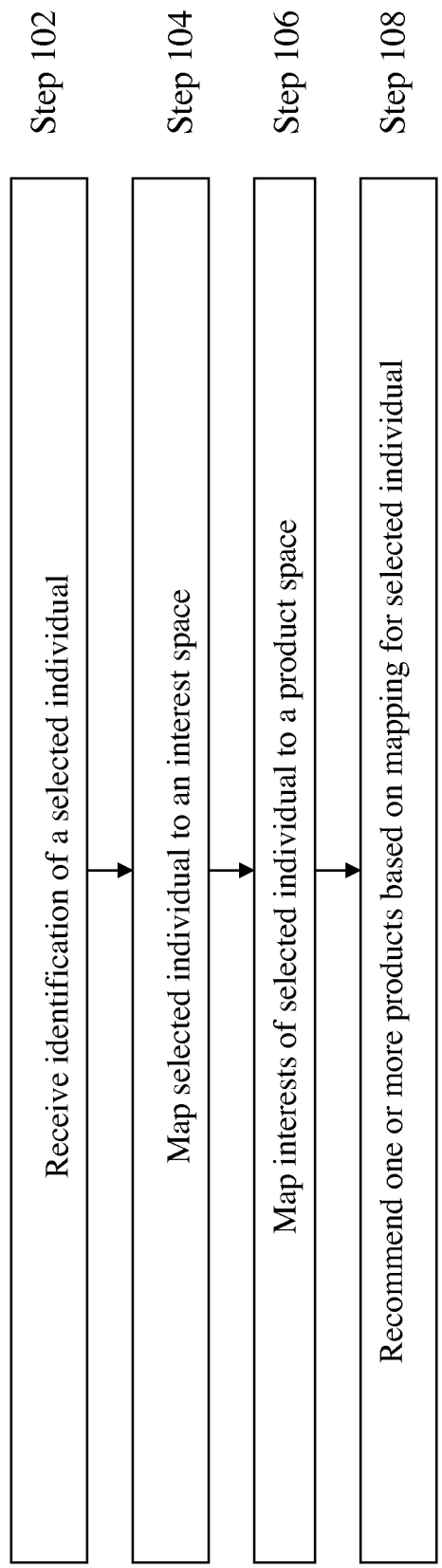
FIG. 1 is a flowchart of an exemplary computer-executable method for recommending one or more products and/or services for a selected individual.

Exemplary embodiments provide methods, systems and devices for recommending one or more products and/or services for a selected individual. The products and/or services may be recommended to a user for gifting to the selected individual. Exemplary embodiments may automatically determine one or more topics of interest to the selected individual. In an exemplary embodiment, semantic analysis may be performed on textual content associated with the selected individual to automatically extract the topics of interest to the selected individual. Exemplary embodiments may use the topics of interest to automatically determine one or more products and/or services in which the selected individual is likely to be interested.

Certain terms are defined below to facilitate understanding of exemplary embodiments.

As used herein, the term "product" refers to a physical product (e.g., jewelry, antiques, etc.) and/or an intangible service (e.g., a subscription to a magazine, spa treatment, etc.).

As used herein, the term "product space" refers to a collection of all available product or service items from which a selected one or more items may be recommended for an individual using exemplary embodiments. When an interest or a topic or category of interest is mapped to the "product space," one or more product or service items in the "product space" are selected based on whether the items match the interest.

In exemplary embodiments, the specification of the "product space" may be changed based on any suitable criteria. In one example, if a user wishes to purchase an item from a specific store, the "product space" may be defined to include only those products and services available at that store. In another example, if a user wishes to purchase an item from the Internet, the "product space" may be defined to include only those products and services available on the Internet. In another example, a default "product space" may be any product or service available anywhere in the world.

As used herein, the term "giftable" refers to a product or service item that is suitable for a gift. In exemplary embodiments, a collection of product and service items may be defined as being "giftable" or "ungiftable," for example, by providing a giftability score in a data structure associated with each item.

The range of products of services that are considered "giftable" or "ungiftable" in exemplary embodiments may be changed by a user, programmer or developer and is not static. In an exemplary embodiment, a collection of items that is considered "giftable" or "ungiftable" may be changed based on the individual for whom products and services are to be recommended using exemplary embodiments. For example, in cases in which exemplary embodiments are used to recommend products and services for a school-teacher, a collection of "giftable" items may be defined as including school supplies, while the definition of "giftable" items used to recommend products and services for all other people may exclude school supplies. In an exemplary embodiment, the collection of items that are considered "giftable" or "ungiftable" may be changed globally for all individuals for whom products and services are to be recommended using exemplary embodiments. For example, if a new product is released on the market (e.g., a new toy), the collection of items that are considered "giftable" may be expanded to include the new product.

As used herein, the term "interest space" refers to a collection of topics that may be of interest to an individual. The "interest space" may be defined broadly to include any possible area of interest to an individual, for example, abstract concepts (like mathematics, philosophy), specific celebrities (like Anderson Cooper), specific events (like Pearl Harbor), and the like.

As used herein, the term "affinity" refers to a quantitative or qualitative level of interest of an individual in a particular topic of interest.

As used herein, the term "trending" refers to a level of popularity of a topic that is being discussed by multiple users of social networking websites, e.g., Twitter™.

As used herein, the term "semantic analysis engine" refers to a computational system, a computational system module, a computational engine, or a computer-executable method or program that may be performed by a computational system to perform one or more semantic analysis techniques on one or more pieces of text.

As used herein, the term "doctagger" refers to a computational system, a computational system module, or a computer-executable method or program that may be performed by a computational system to perform one or more semantic analysis techniques on one or more pieces of text. In an exemplary embodiment, a doctagger may semantically analyze one or more pieces of text and to determine one or more topics or categories of interest relevant to the text. In an exemplary embodiment, a doctagger may label or tag one or more pieces of text with one or more topics or categories of interest relevant to the text.

As used herein, the terms "data stream," "event stream" and "stream" refer to a sequence of one or more units of data that are published or transmitted in a real-time manner.

As used herein, the terms "stream event" and "event" refer to a unit of data published or transmitted in a data stream in a real-time manner. A stream event may have any suitable data structure or format. In an exemplary format, a stream event may include a collection of one or more attribute-value pairs.

As used herein, the term "slate" refers to a static data structure that may be used to record data about a set of one or more related stream events. A slate may have any suitable data structure or format. In an exemplary format, a slate may include a collection of one or more attribute-value pairs. A slate may be stored corresponding to its unique slatekey attribute value and corresponding to an update operation that updates the slate.

As used herein, the terms "operator" and "operation" refer to a set of one or more computations performed at least partially on one or more stream events in a data stream.

As used herein, the terms "map operation," "map operator" and "mapper" refer to a stream operation performed in exemplary embodiments in which stream events in one or more real-time data streams are processed in a real-time manner to generate zero, one or more new stream events. The generated stream events may be published to one or more real-time data streams. In an exemplary embodiment, a map operation may publish stream events to a data stream from which it accepts stream events as input.

As used herein, the terms "update operation," "update operator" and "updater" refer to a stream operation performed in exemplary embodiments in which stream events in one or more real-time data streams are processed in a real-time manner to create or update one or more persistent static "slate" data structures that are stored in a persistent manner in a durable disk storage. In some exemplary embodiments, an update operation may generate zero, one or more new stream events. The generated stream events may be published to one or more real-time data streams. In an exemplary embodiment, an update operation may publish stream events to a data stream from which it accepts stream events as input.

As used herein, the term "stream computation" refers to a computation performed in real-time on an input that is received from a real-time data stream. That is, the input received by the stream computation may be dynamic and may change over time even as the stream computation is being performed. A stream computation may generate an output that takes the form of a stream event that is published to a real-time data stream, or a data structure that is updated in real-time based on the computation. A stream computation may be performed by one or more map operations and one or more update operations. Exemplary stream computations may include, but are not limited to, determining one or more "hot" or popular topics on Twitter™, determining the time of the last post published by a Twitter™ user, performing K-rank computations to determine a user's influence on other users, performing analytics on data published on a website, determining a user's current interests based on their postings on social networking websites, grouping web page view events into "visits" and generating aggregate statistics over "visits" (such as, a rate at which the web page view is terminated, the number of page views per "visit"), determining different sets of links on a web page to identify a set that maximizes the click-through rate (CTR), and the like.

As used herein, the term "computer-readable medium" refers to a non-transitory storage hardware, non-transitory storage device or non-transitory computer system memory that may be accessed by a computational system or a module of a computational system to encode thereon computer-executable instructions or software programs. The "computer-readable medium" may be accessed by a computational system or a module of a computational system to retrieve and/or execute the computer-executable instructions or software programs encoded on the medium. The non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM, etc.) and the like.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

FIG. 1 is a flowchart of an exemplary computer-executable method for recommending one or more products and/or services for a selected individual. In step 102, exemplary embodiments may receive identification of a selected individual. In step 104, exemplary embodiments may map the selected individual to an interest space to indicate one or more topics of interest to the selected individual. In step 106, exemplary embodiments may map one or more topics of interest identified in the interest space for the selected individual to a product space. The product space may include one or more products and/or services that are likely to be of interest to the selected individual. In step 108, exemplary embodiments may recommend the products and/or services identified in the produce space for the selected individual, for example, for purchase by the selected individual or as a gift for the selected individual.

Figure 2:
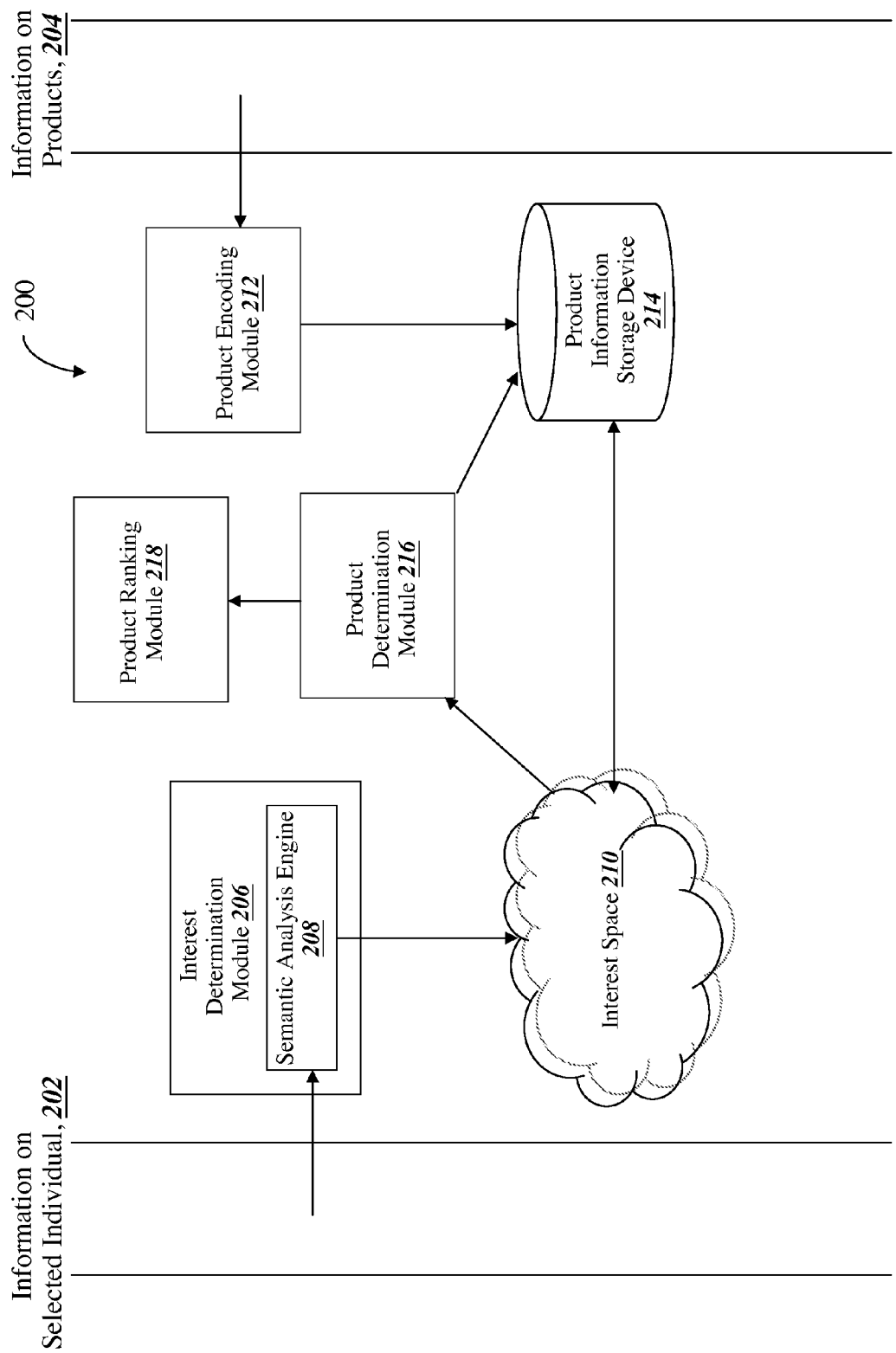
FIG. 2 is a block diagram representing an exemplary computational system for implementing the method of FIG. 1.

FIG. 2 is a block diagram representing an exemplary computational system 200 for implementing the method of FIG. 1. The system 200 may include a source of information 202 on a selected individual (for example, websites on the Internet) and a source of information 204 on products and services for recommending for the selected individual (for example, a store location, a store website, etc). The system 200 may include an interest determination module 206 that may determine one or more topics of interest to the selected individual based on information received from the source of information 202.

In an exemplary embodiment, the interest determination module 206 may include a semantic analysis engine 208 that may parse textual content received from the source of information 202, and may perform semantic analysis on the textual content to extract one or more topics of interest corresponding to the textual content. In an exemplary embodiment, the semantic analysis engine 208 may be provided integrally with the interest determination module 206. In another exemplary embodiment, the semantic analysis engine 208 may be provided separately from the interest determination module 206. In this case, the interest determination module 206 may forward information on the selected individual obtained from the source 202 to the semantic analysis engine 208. The semantic analysis engine 208 may receive the information, perform semantic analysis on the textual content, and transmit results of the analysis including extracted topics of interest back to the interest determination module 206. The interest determination module 206 may receive the topics of interest from the semantic analysis engine 208.

The topics of interest may be used to define an interest space 210 for the selected individual. The interest space 210 may be embodied in any suitable data structure and format. For example, the interest space 210 may be expressed in the JavaScript Object Notation (JSON) standard in an exemplary embodiment. Exemplary embodiments may store the interests corresponding to the selected individual as defined in the interest space 210 in a durable manner, for example, on a durable disk storage.

The exemplary system 200 may include a source of information 204 on one or more products and/or services. The system 206 may include a product encoding module 212 that may encode data on each product with additional information on the product, e.g., information on the corresponding topics of interest, and the like. The encoded product information may be stored in a durable manner on a product information storage device 214. That is, information on the products stored in the device 214 may be associated with topics of interest in the interest space 210.

The exemplary system 200 may include a product determination module 216 that maps one or more interests defined in the interest space 210 for a selected individual to one or more products in the product information storage device 214. The product determination module 216 may receive, as input, one or more topics of interest in the interest space 210 corresponding to a selected individual. The product determination module 216 may access the product information storage device 214 to retrieve one or more products that fit the topics of interest.

In some exemplary embodiments, the exemplary system 200 may include a product ranking module 218 that may receive, as input, the products determined by the product determination module 216. The product ranking module 218 may rank the products to form an ordered list. The ranking may be based on any desired criteria, e.g., in descending order of suitability for recommending to the selective individual.

FIG. 3 illustrates an exemplary collection of information 300 on a selected individual "Mary B" 302 and products recommended for the individual based on her interests. Exemplary embodiments may create an interest profile 304 for the individual 302 based on one or more sources of information on the individual, for example, social networking websites, blog publishing websites, etc. The interest profile may include one or more topics of interest 306, e.g., music, travel, TV, politics, Lady Gaga, Philippines, The Amazing Race, Anderson Cooper, etc. The topics of interest may be provided collectively or may be sub-divided into different hierarchical levels. For example, low-level categories may be provided for more general or abstract interests, e.g., music travel, TV, politics, while higher-level categories may be provided for more specific interests, e.g., Anderson Cooper. The interest profile may also include information on which websites are frequented by the individual and/or on which websites the individual have user accounts 308, e.g., the CNN™ news network and the Facebook™ social networking website. The interest profile may also include recent information 310 corresponding to the individual, e.g., that the individual is planning a trip to China and Mongolia. One of ordinary skill in the art will recognize that exemplary interest profiles may include more or fewer types of information that those shown in FIG. 3. Any or all of the information on the individual's interest profile may be used to automatically recommend one or more products for the individual.

Based on her interest profile, three exemplary products shown in FIG. 3 may be recommended for the individual. The exemplary products include a laptop 312 that is available for purchase in a particular store and/or on its website (e.g., at Wal-Mart Stores, Inc.), a documentary CD-ROM 314 published by the CNN™ news network, and a language translator 316. Relevant product information may also be provided automatically, e.g., a store at which the product is available, a brand name, a price, etc.

Figure 4:
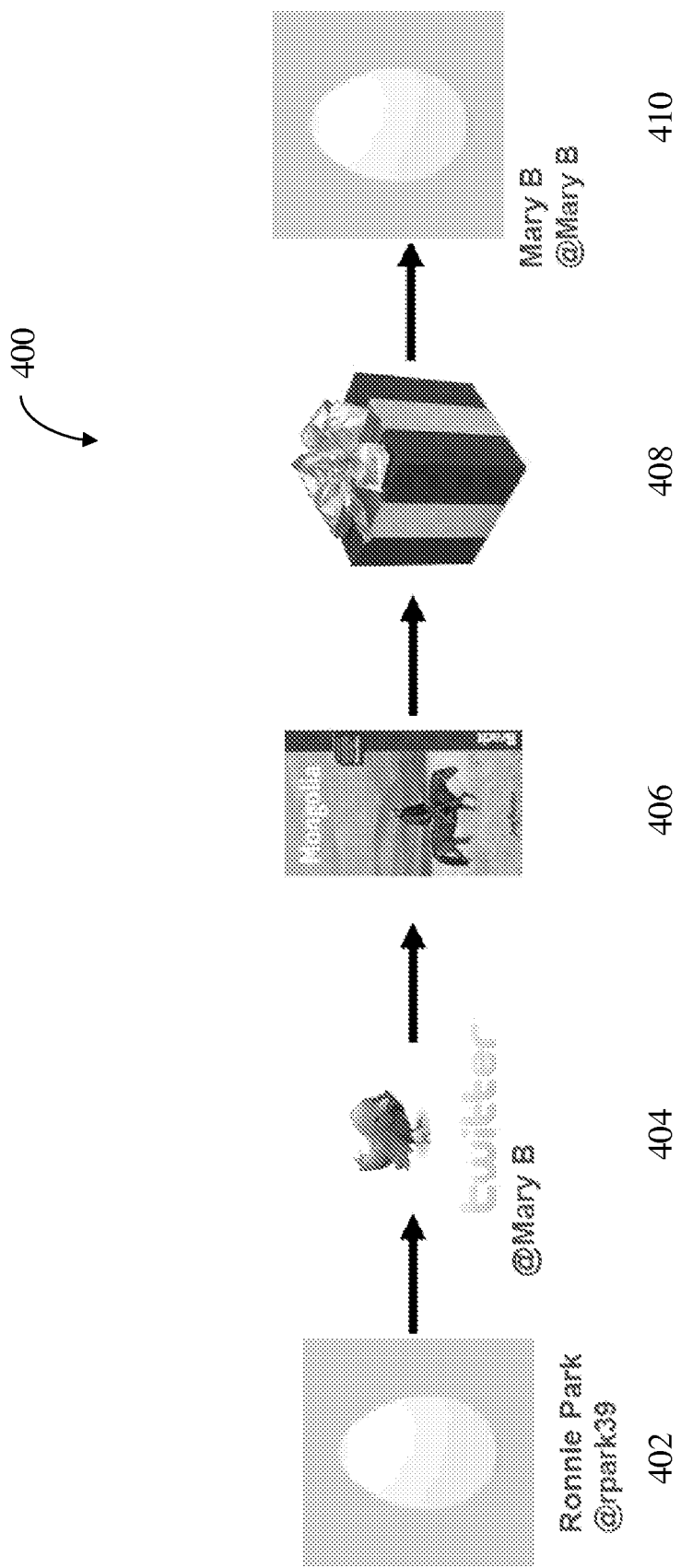
FIG. 4 illustrates an exemplary process and the entities involved in the process for recommending products for a selected individual.

FIG. 4 illustrates an exemplary process and the entities involved in the process for recommending products for a selected individual. A user named "Ronnie Park" 402 may use exemplary embodiments to determine products recommended for a different selected individual, for example, for his friend "Mary B" 410. Based on the selection of "Mary B" 410, one or more sources of information 404 on "Mary B" may be consulted, e.g., a Twitter™ account for "Mary B." Content published by Mary B on her Twitter™ account may be analyzed to extract a topic of interest 406. For example, a "tweet" published by Mary B stating "Planning to visit Mongolia" may be analyzed to determine that Mary B is interested in the topic "Mongolia." Based on the topic of interest 406, exemplary embodiments may automatically determine one or more giftable products 408 suitable for Mary B based on her interests, e.g., a travel guide of Mongolia.

I. Exemplary Mapping of a Selected Individual to Topics of Interest

Exemplary embodiments may automatically map a selected individual to one or more topics of interest to the individual. That is, exemplary embodiments may map the selected individual to an interest space. Any suitable electronic or programmable mechanism may be used to perform this mapping.

Exemplary embodiments may generate an interest profile for the individual based on, for example, static data and/or stream data. Exemplary embodiments may run a semantic analysis engine, e.g., doctagger, on textual content corresponding to the individual to extract one or more topics of interest. The topics of interest may have different hierarchical levels at different granularities. For example, a first-level category may indicate a high-level concept associated with the information in a stream event, e.g., fiction. A second-level category may indicate an intermediate-level concept, e.g., fantasy fiction. A third-level category may indicate a specific concept, e.g., Harry Potter. In an exemplary embodiment, all levels of categories for a topic of interest may be used to recommend products. In another exemplary embodiment, only more granular topic categories may be used, for example, second and third level topic categories to ensure that the product recommendations are more focused and relevant to the individual's specific interests, not just to his/her general interests.

Figure 5:
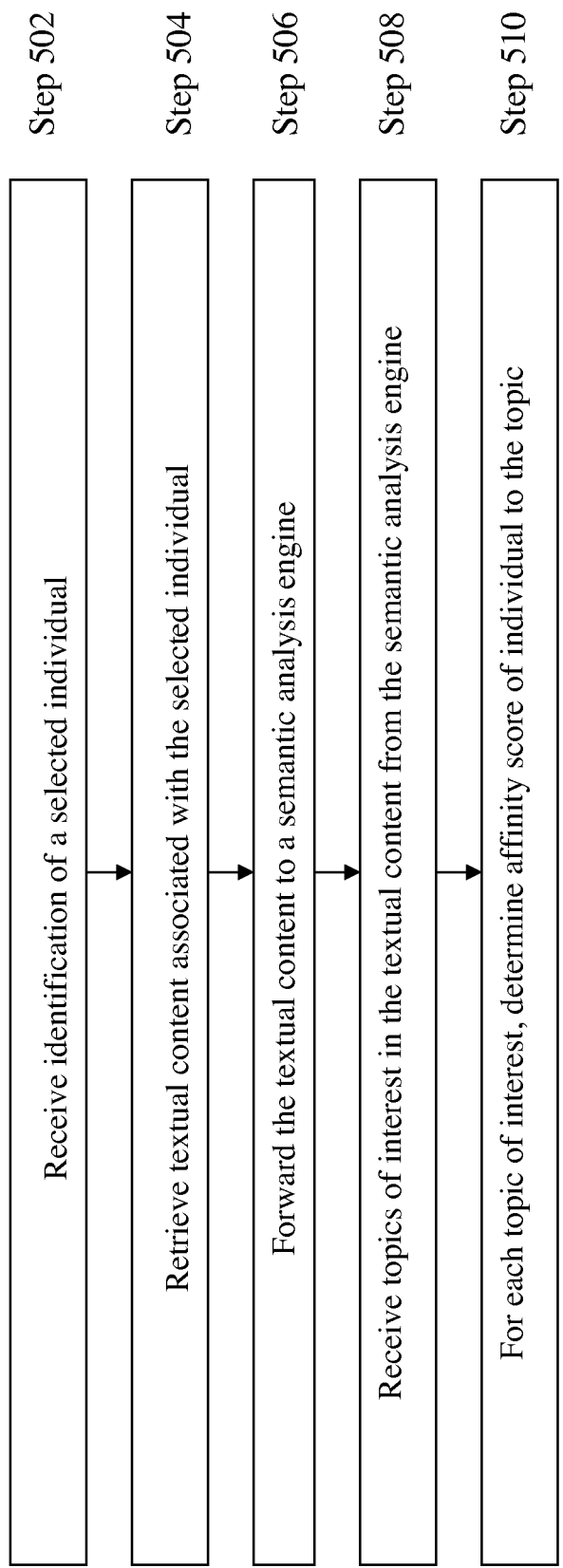
FIG. 5 is a flowchart of an exemplary computer-executable method for determining one or more topics of interest of a selected individual.

FIG. 5 is a flowchart of an exemplary computer-executable method for determining one or more topics of interest to a selected individual.

In step 502, exemplary embodiments may receive identification of a selected individual. In an exemplary embodiment, the identification may be received from a user who may select him/herself or a different individual. In another exemplary embodiment, the identification may be performed automatically. For example, exemplary embodiments may automatically determine and store identification of an owner or user of a mobile computational device (e.g., an iPhone™ communication device, a palmtop computer, etc.), and may automatically map the individual to an interest topic space. In another exemplary embodiment, performance of an activity by an individual on a computational device may automatically lead to selection of the individual in step 502. For example, if an individual creates a digital list of shopping items (e.g., on a mobile communication device), the individual may be automatically selected and products may be recommended for the individual's planned shopping trip. In another exemplary embodiment, performance of an activity by an individual on the Internet may automatically lead to selection of the individual in step 502. For example, if an individual uses, creates an account for and/or logs onto a store website (e.g., http://www.walmart.com), the individual may be automatically be selected for recommending products that may be purchased on the store website.

In step 504, exemplary embodiments may receive or retrieve textual content associated with the selected individual. The textual content may include, but is not limited to, static information, real-time or non-real time data streams, and the like. Exemplary static information may include, but is not limited to, blog posts published by the individual, profile information on social networking websites (e.g., profile and wall data on the FaceBook™ social networking website), profile information on a store website (e.g., http://www.walmart.com), the individual's past purchase records, the individual's page views on certain web pages (e.g., product web pages on a store website), and the like.

Alternatively or additionally, exemplary embodiments may receive one or more data streams associated with the individual. Exemplary data streams may include, but are not limited to, streams of text files, html files, profiles, updates and posts from social networking websites (e.g., the Twitter™, Facebook™, MySpace™ social networking websites), video and photo publishing websites (e.g., the Flickr™, Youtube™ content publishing websites), blog publishing websites (e.g., the Blogger™ publishing website), transactional data streams (e.g., purchase data, inventory data), updates or feeds from any suitable dynamic data repository, logs, maps, RSS feeds, combinations of any of the above, and the like. An exemplary data stream may include more than one type of stream events, for example, both text publications, photos and videos.

In step 506, exemplary embodiments may forward the textual content to a semantic analysis engine for performing semantic analysis on the textual content to determine one or more topics of interest directly or indirectly mentioned in the textual content. In an exemplary embodiment, the doctagger category extraction engine may be used.

If the semantic analysis engine determines that the individual expressed a negative sentiment associated with a topic of interest, the topic of interest may not be used to recommend products. Exemplary methods of determining sentiments and analyzing positive, neutral and negative sentiments are taught in a U.S. non-provisional patent application Ser. No. 13/300, 519 titled "Social Genome," filed Nov. 18, 2011.

In step 508, exemplary embodiments may receive the topics extracted in step 506 from the semantic analysis engine. In an exemplary embodiment, the individual or a different user may edit the topics provided in step 508 to add or remove one or more topics.

In some exemplary embodiments, one or more products recommended for the selected individual may also be based on topics of interest to the individual's close friends and/or relatives. The close friends and relatives of the selected individual may be identified in any suitable method. In one example, the selected individual may manually indicate his/her close friends and/or relatives. In another example, exemplary embodiments may automatically determine the close friends and/or relatives based on biographical information (e.g., biographical information on web pages that indicates that person R is the spouse of the selected individual), interactions between the selected individual and other persons (e.g., the selected individual greeting person T as "Hi Mom" may be used to determine that person T is the selected individual's mother), and the like. Once the close friends and relatives are identified, the exemplary steps 502-508 of FIG. 5 may be used to determine topics of interest for the individual's close friends and relatives.

In some exemplary embodiments, in determining recommended products for the selected individual, exemplary embodiments may only assess the topics of interest of a subset of the selected individual's friends and/or relatives, for example, based on closeness to the selected individual, the number of common interests between a friend/relative and the selected individual, and the like.

In some exemplary embodiments, one or more mutual friends may be determined not to be "close." For example, if person M is a mutual friend of the selected individual and the spouse of the selected individual, exemplary embodiments may determine that the selected individual is not "close" to the selected individual as the relation of the selected individual to person M is likely to be only because of the spouse. In this case, information on a mutual friend (like person M) may not be used or may be discounted in determining the selected individual's affinity scores.

In some exemplary embodiments, persons with a large number of common interests with the selected individual may be considered "close" to the selected individual. For example, if person N shares ten common topics of interest with the selected individual and person P shares only one common topic of interest with the selected individual, then exemplary embodiments may determine that person N is "close" to the selected individual and person P is not "close." In this case, exemplary embodiments may only use person N's information to determine the selected individual's affinity scores.

In step 510, some exemplary embodiments may process the topics of interest extracted from the textual content along with other information to determine an interest profile for the selected individual. The interest profile may include one or more topics of interest to the selected individual.

In some exemplary embodiments, the interest profile may include one or more affinity factors that may be used to indicate an affinity score of the individual to each topic. The affinity scores may indicate how interested the individual is in the topic of interest. Exemplary affinity factors may include, but are not limited to, the number of times a topic of interest is mentioned by the individual, the number of times a topic of interest is mentioned by the close friends and/or relatives of the individual, how many of the individual's close friends and/or relatives are interested in the same topic, the number of times a topic of interest has been mentioned by everyone on the Internet or a website, whether a topic of interest is popular or trending on the Internet, and the like.

In an exemplary embodiment, all determined topics may be used to recommend products. In another exemplary embodiment, only those topics that exceed a predefined affinity score threshold may be used to recommend products. One or more affinity factors may be combined in any suitable way to determine the overall affinity score of the individual to a topic of interest.

The topics of interest, affinity factors and overall affinity scores associated with a selected individual may be stored in a durable manner and may be automatically retrieved from storage. Exemplary storage structures may include any suitable database and/or data structures. The storage data format may include any suitable text-based standard including, but not limited to, Extensible Markup Language (XML), HyperText Markup Language (HTML), JavaScript Object Notation (JSON), and the like.

In some exemplary embodiments, interest profiles may be generated for the friends and/or relatives of a selected individual. Textual content associated with the friends and/or relatives may be analyzed to generate topics of interest. In an exemplary embodiment, the interest profile of the selected individual's friends and/or relatives may be used in conjunction with the interest profile of the selected individual when determining products to recommend for the selected individual. In an exemplary embodiment, the interest profile of the selected individual's friends and/or relatives may be used to determine the affinity of the selected individual to a particular topic of interest. For example, it may be determined that the individual has a higher affinity to a topic M that is also common to his/her friends and/or relatives' interest profile than to a topic N that is not common to his/her friends and/or relatives' interest profile.

In some exemplary embodiments, an interest profile for the friends and/or relatives of the selected individual may be generated based on event-centric views taught in a U.S. non-provisional patent application Ser. No. 13/300,519 titled "Social Genome," filed Nov. 18, 2011 and also on the teachings of a U.S. non-provisional patent application Ser. No. 13/300,523 titled "Real-Time Analytics of Streaming Data," filed Nov. 18, 2011.

In some exemplary embodiments, interest profiles may be generated for one or more demographic groups (e.g., age, gender, occupation, etc.) applicable to a selected individual. Textual content associated with the demographic group may be analyzed to generate topics of interest that are common to the group. In an exemplary embodiment, the interest profile of the demographic group may be used in conjunction with the interest profile of the selected individual when determining products to recommend for the selected individual. In an exemplary embodiment, the interest profile of the demographic group may be used to determine the affinity of the selected individual to a particular topic of interest. For example, it may be determined that the individual has a higher affinity to a topic M that is also common to the demographic group interest profile than to a topic N that is not common to the demographic group interest profile. In some exemplary embodiments, an interest profile for a demographic group may be generated based on the teachings of a U.S. non-provisional patent application Ser. No. 13/300,523 titled "Real-Time Analytics of Streaming Data," filed Nov. 18, 2011.

In some exemplary embodiments, interest profiles may be generated for geographical locations or neighborhoods based on the interest profiles of a plurality of individuals residing in the neighborhood. A neighborhood may be selected in an example based on where a selected individual resides. Textual content associated with the neighborhood and/or the individuals residing in the neighborhood may be analyzed to generate topics of interest that are common to the neighborhood and the individuals in the neighborhood. For example, if a selected neighborhood is the city of Boston, a common interest profile may include the topic of interest "Red Sox," while if the neighborhood is the city of Seattle, a common interest profile may include the topic of interest "Mt. Rainier." In an exemplary embodiment, the interest profile of a neighborhood may be used in conjunction with the interest profile of the selected individual when determining products to recommend for the selected individual. In an exemplary embodiment, the interest profile of a neighborhood may be used to determine the affinity of the selected individual to a particular topic of interest. For example, it may be determined that the individual has a higher affinity to a topic M that is also common to the neighborhood interest profile than to a topic N that is not common to the neighborhood interest profile.

In some exemplary embodiments, an interest profile for a specific location or neighborhood may be generated based on event-centric views taught in a U.S. non-provisional patent application Ser. No. 13/300,519 titled "Social Genome," filed Nov. 18, 2011 and also on the teachings of a U.S. non-provisional patent application Ser. No. 13/300,523 titled "Real-Time Analytics of Streaming Data," filed Nov. 18, 2011. The interest profile for a specific location or neighborhood may also be used to stock a store provided at that location or neighborhood, for example, to provide products and services that are of particular interest to the individuals residing in that neighborhood.

In an exemplary embodiment in which stream data associated with the individual is used to generate topics of interest and affinity factors, stream computation may be used as taught in a U.S. non-provisional patent application Ser. No. 13/300,524 titled "Processing Data Feeds," filed Nov. 18, 2011, U.S. patent application Ser. No. 13/106,706 titled "Processing Data Feeds," filed May 12, 2011, U.S. Provisional Patent Application No. 61/345,252 titled "Content Feed," filed May 17, 2010, and U.S. Provisional Patent Application No. 61/415,282 titled "Managing Real-Time Data Streams," filed Nov. 18, 2010. The entire contents of the above-referenced applications are incorporated herein in their entirety by reference.

In an exemplary embodiment, interest in a particular topic T may be indicated by the number of stream events that mention the topic T in a certain amount of time, e.g., in the last hour, divided by the average number of stream events that mention the topic T in the same hour of the day. In another exemplary embodiment, interest in a particular topic T may be indicated by a z-score that takes into account both the mean and the standard deviation of hourly mentions of the topic T.

In an exemplary approach, a TopicTagger map operation may be performed to determine the topics discussed in the stream events. A TopicCounter update operation may be performed to count the number of occurrences of a particular topic in the stream events. A TopicThermometer update operation may be performed to indicate those topics that have an unusually high interest indicated by the interest exceeding a predefined threshold interest. A TopKTopic update operation may be performed to determine the top K topics at a time of day.

An exemplary TopicTagger map operation may subscribe to a real-time input data stream S0, e.g., a Twitter™ stream. A stream event in the exemplary Twitter™ stream may have an eventkey attribute value the user ID of a Twitter™ user, and a text attribute value containing the full text of the "tweet" event. The TopicTagger map operation may receive a stream event from the subscribed data stream and run a document parsing mechanism on the text attribute value of the "tweet" event. In an exemplary embodiment, the doctagger operator may be run on the text attribute value to extract a set of one or more topics (KCIDs) mentioned in the "tweet." For each KCID in the "tweet," the TopicTagger map operation may create and publish a new event on an intermediate real-time data stream S1. The eventkey attribute value of the new event may be a collection or combination of the KCID and the time at which the "tweet" was generated, e.g., {KCID, time_of_day}. The new event may also include a KCID attribute whose value is the KCID corresponding to the event, and a timestamp attribute whose value is the time at which the "tweet" was generated. The intermediate data stream S1 may be provided in a stream bus so that any of the map and update operations may access the new events.

The following pseudo-code represents an exemplary object-oriented class TopicTagger that may be used to implemented the TopicTagger map operation.

```
class TopicTagger(Mapper):
    def map(event):
        kcids = doctag(event.text)
        h = date().hh()// hour in hh format
        for kcid in kcids:
            self.publish("s1", Event(key:hh+kcid, topic:kcid))
```

An exemplary TopicCounter update operation may subscribe to the real-time intermediate data stream S1. For a particular topic and a time of day associated with a stream event in the data stream S1, the TopicCounter update operation may be called on a slate S corresponding to the topic and the time of day. The slate S may be expired in a predefined period of time, e.g., one hour. The TopicCounter update operation may maintain a variable count in the slate that counts the number of occurrences of the topic at the time of day associated with the slate. When the slate expires, the TopicCounter update operation may create and publish to a real-time intermediate data stream S2 a new stream event whose eventkey attribute is a collection or combination of the topic KCID and the time at which the "tweet" was generated, e.g., {KCID, time_of_day}. The value of the eventkey attribute may be the value of the count variable that indicates the number of occurrences of the topic at the time of day. The new stream event may be created and published by a finalize method of the TopicCounter updating operation.

The following pseudo-code represents an exemplary object-oriented class TopicCounter that may be used to implemented the TopicCounter update operation.

```
class TopicCounter(Updater):
    def init(slate):
        slate.count = 0 // total number of mentions
        slate.set_expiry(next_hour())
        // assume we've written a utility fn to compute the
        // timestamp of the next hour
    def update(event, slate):
        slate.count += 1
    def finalize(slate):
        self.publish("s2", Event(key:slate.key, value:count))
```

That is, the TopicCounter update operation may be used in exemplary embodiments to determine the number of times a topic of interest has been mentioned by a selected individual, the close friends and/or relatives of the selected individual, by all users of a social networking website, by all users on the Internet, and the like. These numbers may be used as affinity factors, i.e., the higher the number of mentions of a topic of interest, the higher is the affinity of the selected individual to the topic of interest. The affinity factors may be used to determine an overall affinity score of the selected individual to the topic of interest.

An exemplary TopicThermometer update operation may subscribe to the real-time intermediate data stream S2. The update operation may be invoked with a slate S corresponding to a particular topic KCID and time of day. The TopicThermometer update operation may maintain the following variables: variable N that includes the total number of mentions of the topic at the time of day, variable D that includes the number of days that the information has been tracked, variable avg that includes the average number of mentions of the topic (i.e., N/D), and variable interest that includes an indication of the interest in the topic determined as count/avg. If the value of the interest variable is equal to and/or above a predefined threshold, the TopicThermometer update operation may create and publish to a real-time intermediate data stream S3 a new stream event with the topic KCID as the eventkey attribute and the interest level as the eventkey attribute value.

The following pseudo-code represents an exemplary object-oriented class TopicThermometer that may be used to implemented the TopicThermometer update operation.

```
class TopicThermometer(Updater):
    def init(slate):
        slate.n = 0
        slate.d = 0
    def update(event, slate):
        avg = (slate.n+1) / (slate.d+1) // avoid zero div
        intrst = event.count / avg
        if intrst > threshold:
            publish("s3",Event(key:slate.kcid,interest:intrst))
        // update stats
        slate.n += event.count
        slate.d += 1
```

That is, the TopicThermometer update operation may be used in exemplary embodiments to determine popular or trending scores for topics of interest, for example, on the Internet as a whole or on any specific websites. The popularity and/or trending scores may be used as affinity factors, i.e., the higher the popularity or trending scores for a topic of interest, the higher is the affinity of the selected individual to the topic of interest. The affinity factors may be used to determine an overall affinity score of the selected individual to the topic of interest.

In an exemplary embodiment, a data structure may be maintained to record the top K topics at any time of the day. A TopKTopic update operation may be used to maintain this data structure. The TopKTopic update operation may subscribe to the real-time intermediate data stream S3 and may use a slate to maintain a priority queue that tracks the top K interest scores in the events of stream S3. The TopKTopic update operation may also track the top K topics by a selected individual, a selected location and/or category.

That is, the TopKTopic update operation may be used in exemplary embodiments to determine to K popular topics of interest, for example, for the selected individual, for all users on the Internet as a whole, or for users on any specific websites. In an exemplary embodiment, only the top K popular topics may be used in recommending products. In another exemplary embodiments, the top K popular topics may be used in ranking products, so that products corresponding to popular topics are ranked higher.

II. Exemplary Encoding and Storage of Product Information

Exemplary embodiments may store and provide information on one or more products and services that may be used to recommend a product or service for a selected individual. Exemplary information on a product or service may include, but is not limited to, a unique identifier, one or more prices (e.g., a ticker price, a discounted price), identification of one or more sellers, a brand name, an average customer rating, a textual description, one or more images of the product, and the like.

The information may include an indication of whether the product or service is giftable (with exemplary values of yes, no, undefined). The value of the "giftability" characteristic may be provided by a user who determines whether the product or service is suitable for purchase as a gift. For example, a music album and a magazine subscription may be assessed and indicated to be giftable, while a water filter may be assessed and indicated to be ungiftable.

The information may include an indication of whether the product or service is particularly suitable or unsuitable for one or more demographic characteristics, for example, whether a product is specially suitable for an age range (such as, adults), a gender (such as, male or female), or a combination of age and gender (such as, teenage girls). The information may also include an indication or score of whether the product or service is trending, i.e., is posted or discussed multiple times on the Internet (e.g., on one or more social network websites).

Exemplary information on products and services may be stored in any suitable storage and data structure. In an exemplary embodiment, the information may take a database entry format and may be stored in a database, for example, a relational database having a primary key that includes a unique identifier for the product or service. In another exemplary embodiment, the information may be formatted as any suitable text-based standard including, but not limited to, Extensible Markup Language (XML), HyperText Markup Language (HTML), JavaScript Object Notation (JSON), and the like.

Figure 6:
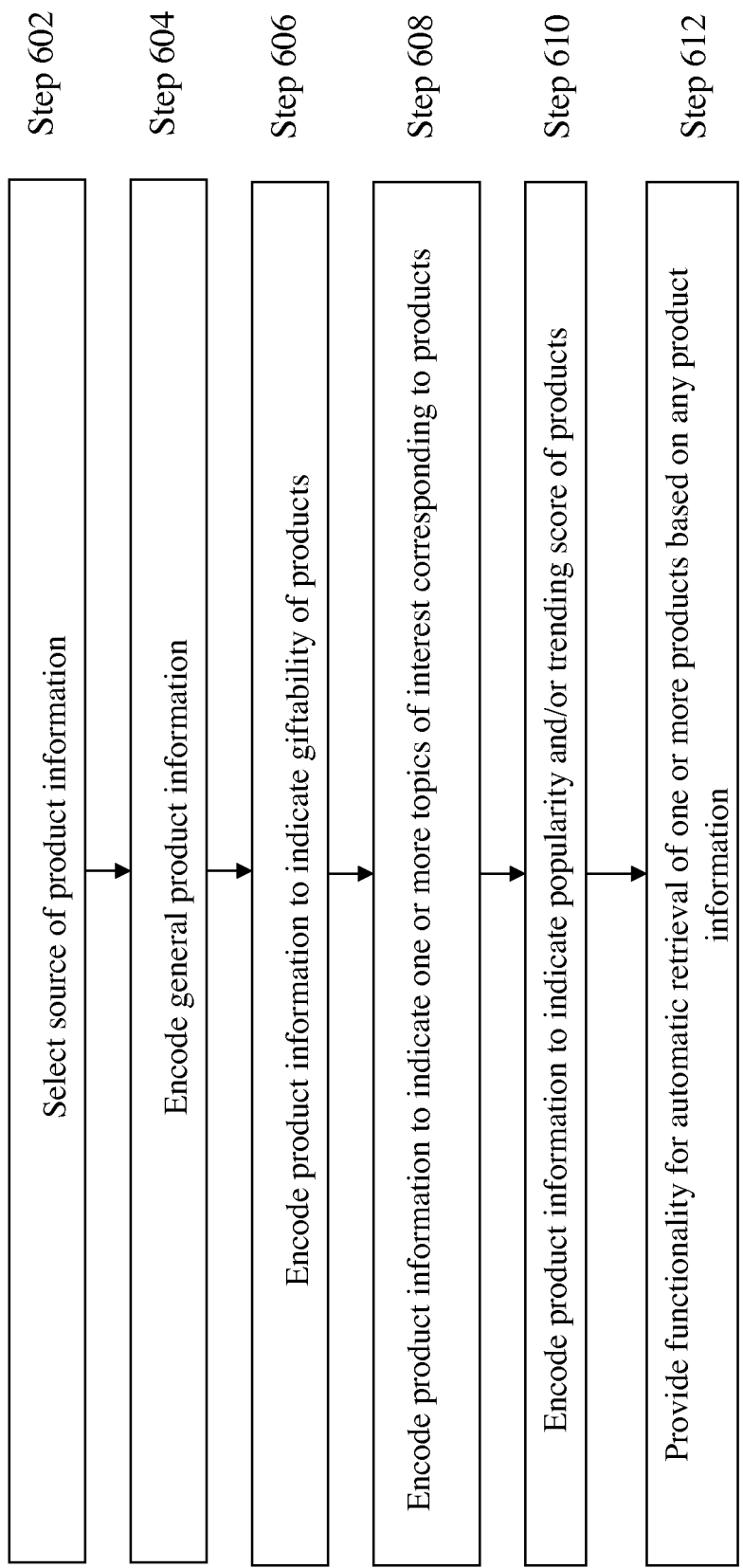
FIG. 6 is a flowchart of an exemplary computer-executable method for providing encoding a source of products information with information on corresponding topics of interest.

FIG. 6 is a flowchart of an exemplary computer-executable method for providing encoding a source of products information with information on corresponding topics of interest.

In step 602, one or more sources of product information may be selected automatically or manually by a user. Product information may be automatically retrieved from the selected product information source. Exemplary product information sources may include, but are not limited to, a store product catalog (e.g., a catalog provided by Wal-Mart Stores, Inc.), a website of product information (e.g., http://www.walmart.com), a collection of data structures or a database containing product information, and the like.

In an exemplary embodiment, one or more characteristics of the selected individual may be used to automatically select or recommend one or more sources of product information. In one example, a geographical location corresponding to the selected individual and/or a user of the system may be used to automatically determine one or more stores in proximity of the location. The product catalogs of the stores may then be used as the product information source. This may allow the selected individual or a user to receive product recommendations for products available at stores that are easily accessible by the individual or the user. In an exemplary embodiment, the geographical location may be determined automatically using, for example, a Global Positioning System (GPS).

In another example, one or more topics of interest to the selected individual may be used to automatically determine one or more product information sources that are suitable for the topics of interest. For example, if the selected individual is determined to be interested in antique furniture, the product catalog or website of an antique store may be automatically selected.

In step 604, product information from the selected product information source may be automatically retrieved and encoded in a suitable uniform format, e.g., in a JSON format, in a suitable database and/or data structures. For website sources, a web crawler may be used to extract product information.

In step 606, product information corresponding to the products may be encoded with giftability scores that indicate whether the products are suitable for purchasing as a gift.

In an exemplary embodiment, the giftability scores may be binary values indicating that a product is giftable (the score having a value of "1" or "yes") or that a product is ungiftable (the score having a value of "0" or "no"). In another exemplary embodiment, the giftability scores may have a range of quantitative or qualitative values, e.g., extremely giftable (score=1, for example), very giftable ($0.7<score<1$, for example), giftable ($0.5<score<0.7$, for example), somewhat giftable ($0.3<score<0.5$, for example), not very giftable ($0<score<0.3$, for example), and not giftable at all (score=0, for example).

In an exemplary embodiment, the giftability scores may be provided manually, for example by a human user. In another exemplary embodiment, the giftability scores may be determined automatically, for example, by analyzing one or more characteristics of the products. Mappings of product characteristics and their corresponding giftability scores and/or ungiftability scores may be stored in a suitable database. Certain product categories like music albums, gift cards, etc., may be automatically determined to be giftable items. Certain other product categories like light bulbs, toothpaste, etc., may be automatically determined to be ungiftable items. Products that are identified as collectible items may be automatically determined to be giftable items having high giftability scores.

In step 608, product information corresponding to the products may be encoded to indicate one or more topics of interest associated with each product. In some exemplary embodiments, each product may be encoded with multiple topics of different granularities and/or disparate topics. For example, a John Coltrane music CD may be encoded with the following topics: "music," "jazz music," "saxophone," "avant-garde," and the like.

In an exemplary embodiment, the topics of interest corresponding to a product may be automatically determined by analyzing available information in the source, e.g., by parsing a textual description of the product on a web page. In another exemplary embodiment, the topics of interest corresponding to a product may be automatically determined by analyzing one or more sources of information on the Internet, e.g., social networking websites like Facebook™ and Twitter™. The sources of information on the Internet may include, for example, customer reviews of the product or descriptions of the product that may be used to determine relevant topics of interest corresponding to the product.

In an exemplary embodiment, the topics of interest corresponding to a product may be automatically determined by a computational system or method that automatically processes data (e.g., stream data or non-stream data on the Internet or offline data), and that identifies connections among social elements in the data (e.g., "John Coltrane" connected with "jazz music"). An exemplary computational system and method that processes data and identifies connections among social elements in the data is described in a U.S. non-provisional patent application Ser. No. 13/300,519 titled "Social Genome," filed Nov. 18, 2011, and in U.S. Provisional Patent Application No. 61/415,279 titled "Social Genome," filed Nov. 18, 2010. The entire contents of the above-referenced applications are incorporated herein in their entirety by reference.

In step 610, product information corresponding to the products may be encoded to indicate the popularity of each product and/or to provide an indication of whether each product is trending, for example, on social networking websites or on the Internet in general. In an exemplary embodiment, the popularity and trending scores may be provided manually by a user. In another exemplary embodiment, the popularity and trending scores may be determined automatically by any suitable computer-executable method using stream data on the Internet (as described in Section I). In another exemplary embodiment, static data content on the Internet corresponding to a product may be used to determine the popularity and trending scores including, but not limited to, the number of copies of the product sold using a store website, the average customer rating of the product, the number of Google™ search results for the product, the general sentiment on the Internet on the product, and the like. In another exemplary embodiment, a combination of static and real-time data on the Internet may be used to determine popularity and/or trending scores of products.

In an exemplary embodiment, real-time data streams (e.g., data streams received from social networking sites, Internet publishing sites, and the like) may be analyzed to determine in a real-time manner the popularity and/or trending nature of a product, the overall sentiment on the product, and the like, as described in Section I. An exemplary computational system and method may analyze real-time data streams to determine popularity and trending scores is described in a U.S. non-provisional patent application Ser. No. 13/300,524 titled "Processing Data Feeds," filed Nov. 18, 2011, in U.S. patent application Ser. No. 13/106,706 titled "Processing Data Feeds," filed May 12, 2011, in U.S. Provisional Patent Application No. 61/345,252 titled "Content Feed," filed May 17, 2010, and in U.S. Provisional Patent Application No. 61/415,282 titled "Managing Real-Time Data Streams," filed Nov. 18, 2010. The entire contents of the above-referenced applications are incorporated herein in their entirety by reference.

In step 612, functionality may be provided to allow automatic determination of one or more products based on one or more product attributes, e.g., one or more topics of interest, a price range, popular products, trending products, giftable products, and the like. In addition, once a product has been selected, the functionality may allow retrieval of one or more desired characteristics or attributes of the product, e.g., topics of interest associated with the product, whether the product is giftable, how popular the product is, how much the product is trending, and the like. Any of the stored information associated with a product or service may be queried by a user, for example, using a user interface or by directly accessing a stored data structure (e.g., using SQL queries). Any of the stored information associated with a product or service may be automatically retrieved and provided to a user when the product or service is recommended to the user for purchase by the user or for gifting to a selected individual.

FIG. 7 illustrates an exemplary data structure 700 formatted in the JSON standard for providing information on an exemplary product (a music CD titled "John Coltrane Plays For Lovers (Remaster)") and having a unique ID 702 ("2315741"). The JSON data structure 700 may include information on suitability of the product to a gender group 704 ("unisex"-indicating suitability for both genders) and an age group 706 ("adult"—indicating suitability for adults). The JSON data structure 700 may include a canonicalized HTML URL 708 for a store web page for the product or service ("www.walmart.com/ip/2315741"), a base price 710 ("$9"), a seller 712 ("Walmart.com"), a description 714 ("        "—indicating that the product has not yet been described), a customer rating 716 ("0"—indicating that the product has not yet been rated), and an indication of whether the product is giftable 718 ("true"—indicating that it is giftable). The JSON data structure 700 may also include a trending score 720.

One of ordinary skill in the art will recognize that exemplary structures or formats of storing product information are not limited to the exemplary JSON format illustrated in FIG. 7. One of ordinary skill will also recognize that each product may be associated with more or less information than the information illustrated in FIG. 7.

III. Exemplary Mapping of Topics of Interest to Products

Exemplary embodiments may automatically map one or more topics of interest corresponding to a selected individual to one or products recommended for the selected individual based on his/her interests. That is, exemplary embodiments may map topics of interest to a product space.

Figure 8:
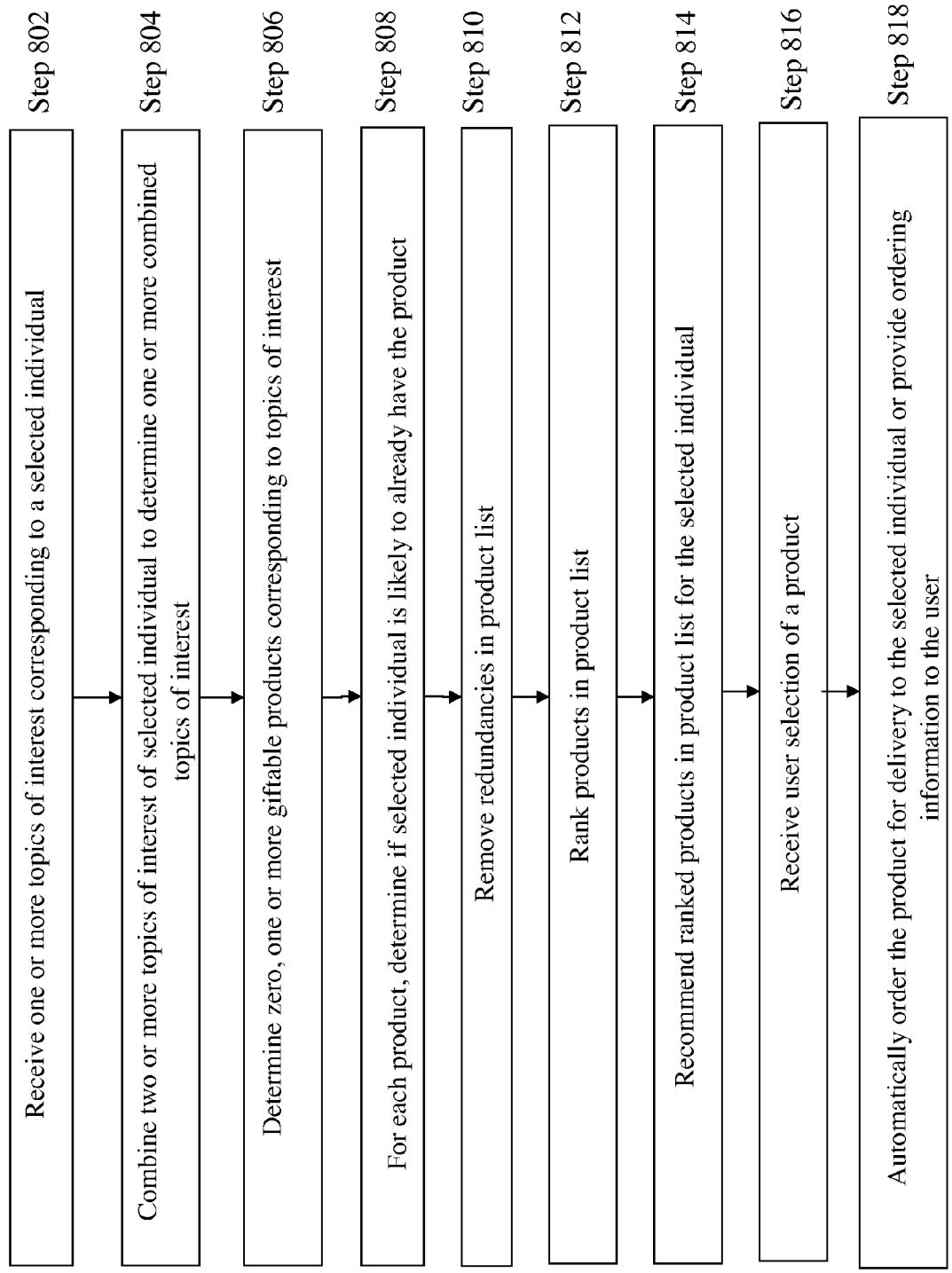
FIG. 8 is a flowchart of an exemplary computer-executable method for mapping one or more topics of interest corresponding to a selected individual to one or products recommended for the selected individual.

FIG. 8 is a flowchart of an exemplary computer-executable method for mapping one or more topics of interest corresponding to a selected individual to one or products recommended for the selected individual.

In step 802, one or more topics of interest corresponding to the selected individual may be received or generated.

In an exemplary embodiment, in step 804, two or more topics of interest may be combined to generate one or more combined topics of interest. This process may be repeated for additional two or more topics of interest. In one example, the separate topics of interest "Harry Potter" and "books" may be combined to generate a combined topic of interest "Harry Potter books." In another example, the separate topics of interest "Korea" and "history" may be combined to generate combined topics of interest "Korean War" and "Joseon Dynasty." Exemplary embodiments may combine the topics using any suitable electronic or programmable mechanism including, but not limited to, a stored mapping of unitary topics to combined topics, a knowledge-based system that may include knowledge representations on how to combine topics of interest, and the like.

In step 806, for each topic of interest (i.e., both unitary and combined topics of interest), exemplary embodiments may determine zero, one or more products that correspond to the same topic of interest. In a searchable product database, the topic of interest may be a searchable category that may be used to find products having the desired topic of interest. For example, if the selected individual is interested in "jazz music," the same topic of interest may be used to automatically retrieve one or more jazz music albums, e.g., Sun Ra's "Space is the Place," that also share the same topic of interest. In an exemplary embodiment, only products that are indicated to be giftable, e.g., by giftability scores of a certain value or above a certain threshold, may be determined in step 806. In another exemplary embodiment, both giftable and ungiftable products may be determined in step 806.

One or more additional product characteristics may be used to determine products in step 806. For example, a price range may be received and used to determine only those products that fall within the price range.

In some exemplary embodiments, affinity scores of the individual to the topics of interest may also be used to automatically determine one or more products recommended for the individual. In one example, only those topics of interest having affinity scores above a predefined threshold may be used in determining recommended products. In another example, topics of interest weighted by their affinity scores may be used in determining recommended products. For example, a higher number of products may be recommended for a highly weighted topic (e.g., a topic that is frequently mentioned by the selected individual) than a lower weighted topic.

In an exemplary embodiment, the same products may be recommended for one or more of the individual's friends or relatives, for example, if they have interests in common. For example, if persons A and B share a topic of interest, and if a product corresponding to the topic is recommended for person A, the same topic may also be recommended for person B.

In step 808, for each product determined, exemplary embodiments may automatically determine if the selected individual is likely to already possess the product. If it is determined that the selected individual is likely to already possess the product, then the product may be removed from the list of recommended products. In an exemplary embodiment, information corresponding to the selected individual on the Internet (e.g., published by the selected individual on social networking websites, blogs, etc.) may be analyzed using a semantic analysis engine or using a pattern matching engine to automatically determine if the selected individual already has the product. In one example, a semantic analysis engine may analyze textual content published by the selected individual to determine whether the individual has discussed purchasing or receiving the product. In another example, a pattern matching engine to search for key terms like "bought product X," "received product X," "enjoying product X," and the like.

Exemplary embodiments may use a combination of whether the selected individual has mentioned the product and one or more characteristics of the product. That is, even if the selected individual does not explicitly publish that he/she has received or purchased or has the product, exemplary embodiments may still determine whether the selected individual is likely to have the product based on one or more characteristics of the product. In one example, for product categories like music and books, if the selected individual discusses a product, it is likely that the individual already possesses the product. In another example, for product categories like movies, if the if the selected individual discusses a product, it is unlikely that the individual already possesses the product. This is because products in a product category like movies are typically enjoyed by individuals viewing the products at a theater, and more rarely by purchasing them.

Exemplary embodiments may use a combination of whether the selected individual has mentioned the product and a sentiment on the product expressed by the individual as determined by a semantic analysis engine. If the individual expresses a position or negative sentiment on the product, it is likely that the individual already possesses the product, relative to a case in which the individual merely mentions the product.

In an alternate embodiment, the selected individual or a user may be queried to determine if the selected individual already possess a product.

In step 810, redundancies in the product list may be automatically removed. In an exemplary embodiment, if two or more products have second and/or third-level topic categories in common, then the products may be determined to be redundant, and all but one of the common products may be removed. Removal of redundancies ensures that redundant products are not recommended, since a more diversified list of product recommendations is more desirable.

A taxonomy may be provided in exemplary embodiments to categorize the topics of interest hierarchically. The taxonomy may provide a plurality of categories for categorizing information at different levels of granularity. In an exemplary embodiment, the topics of interest may be analyzed and categorized based on one or more categories, for example, first, second and third-level categories indicating increasing granularities of categorization. For example, a first-level category may indicate a high-level concept, e.g., fiction. A second-level category may indicate an intermediate-level concept, e.g., fantasy fiction. A third-level category may indicate a specific concept, e.g., Harry Potter. One of ordinary skill in the art will recognize that additional levels of categories may be used and that, in an alternative embodiment, the granularity of categorization may decrease with increasing category levels. Thus, in one example, a Harry Potter book and a Harry Potter CD may be determined to have a common third-level category ("Harry Potter") and may not be recommended together in the same recommended product list, in an exemplary embodiment. In some exemplary embodiments, a taxonomy of entities and their corresponding categories may be provided based on the teachings of a U.S. non-provisional patent application titled "Social Genome," filed Nov. 18, 2011 Ser. No. 13/300,519.

In step 812, the products in the list of products may be ranked in any desirable order, e.g., alphabetical order, in ascending prices, and the like. In an exemplary embodiment, the products may be ranked in an order that is most likely to be of interest to the selected individual. This allows a user to be confident that the selected individual is very likely to be interested in products at or near the top of the product list. The user may thus select a product at or near the top of the product list for gifting to the selected individual.

In exemplary embodiments, one or more factors may be used to rank the products in which higher-ranked products may be considered more suitable for providing as a gift to a selected individual. An exemplary factor is the giftability score of each product. Products with higher giftability scores may be ranked higher than products with lower giftability scores to provide preference to products that are more suitable for gifting. For example, collectible items (e.g., period glass, historical memorabilia) may have higher giftability scores than household items (e.g., soap, dishwasher), and may therefore be ranked higher than household items.

Another exemplary factor is the number of the selected individual's topics of interest that is encompassed by a product. Products that encompass a higher number of topics of interest corresponding to the individual may be considered more relevant to the user's interests, and may be ranked higher than products that encompass a fewer number of topics of interest. For example, if the individual is interested in topics "history," "Japan" and "books," a recommended product like John Toland's book "The Decline and Fall of the Japanese Empire" may encompass all three topics, while another recommended product like J. K. Rowling's "Harry Potter and the Deathly Hallows" may only encompass a single topic of interest "books." In this example, John Toland's book may be determined to be more closely aligned with the interests of the individual, and may be ranked higher than J. K. Rowling's book.

Another exemplary factor is the level of interest exhibited by the selected individual toward one or more categories of interest corresponding to a product. This level of interest may be expressed as an overall affinity score that is generated using one or more affinity factors (e.g., the number of times the individual has mentioned the topic). Higher affinity scores indicate greater interest of the individual to a topic of interest, and therefore, it is more likely to be relevant in recommending a product to the individual.

Another exemplary factor is the average customer ratings received by the products. Products in a given topic of interest with higher average customer ratings may be ranked higher than products with lower customer ratings in order to recommend the most desirable products for the selected individual.

Another exemplary factor includes demographic information on the selected individual, for example, his/her age, his/her gender, his/her geographical location, his/her occupation, and the like. For example, certain products may be ranked higher if they are recommended for women than if they are recommended for men, e.g., ties and cufflinks.

Another exemplary factor includes the interest profile of a geographical neighborhood of the selected individual. Textual content associated with a plurality of individuals in a neighborhood may be analyzed to generate topics of interest that are common to the individuals in the neighborhood. Products that are common to both the selected individual and to his/her neighborhood may be ranked higher than products that are not common to the neighborhood.

Another exemplary factor includes the interest profiles of close friends and/or family members of the selected individual. Textual content associated with the friends and/or relatives of the individual may be analyzed to generate topics of interest that are common to the individual and his/her friends and family. If a product recommended for an individual has corresponding topics of interests that are common to the topics of interest of the individual's friends and/or relatives, the product may be determined to be more of interest to the individual since friends and relatives are likely to share common interests.

Another exemplary factor is the release date of the product and the sales data, because newly released products and popular products may be desirable.

One of ordinary skill in the art will recognize that one or more of the exemplary factors may be combined in any suitable method to rank the products in an ordered list.

In an exemplary embodiment, the ranked list of products may be automatically pruned to retain only the top k products. Since the products are ranked based on suitability for the selected individual, one or more products may be removed from the bottom of the ordered list to ensure that only the most suitable and relevant products are retained in the list.

In step 814, the ranked list of recommended products may be recommended for the individual directly to the individual or to a different user, for example, as a digital list rendered on a graphical user interface. The ranked recommended products may be displayed to a user or to the selected individual him/herself. Exemplary embodiments may also retrieve and present product information associated with the recommended products.

The user interface may allow the user to select one or more of the products for purchase, for example, directly on the user interface presenting the digital list of products. In step 816, exemplary embodiments may receive a user selection of a particular product in the ranked list of recommended products.

In step 818, upon receiving the user selection, exemplary embodiments may automatically order the product for delivery to the selected individual, for example, through a website of a store. Alternatively, exemplary embodiments may provide information on where the selected product may be available (e.g., a store, a store website, a geographical location) and information on acquiring the product (e.g., directions to the store, pulling up an order form on a web page), and the like.

IV. Exemplary Computing Devices

Figure 9:
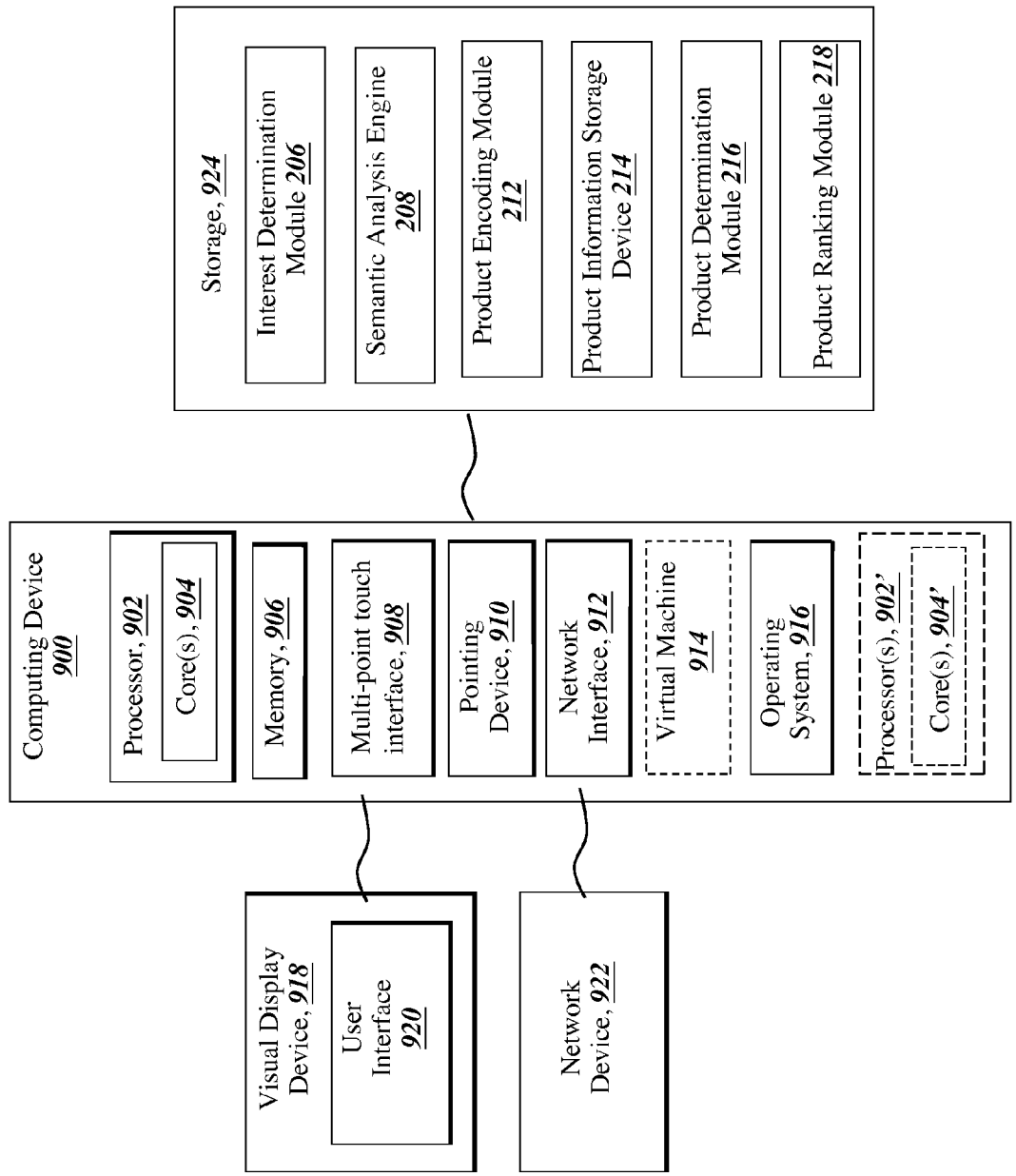
FIG. 9 is a block diagram representing an exemplary computing device that may be used to perform any of the exemplary methods disclosed herein.

FIG. 9 is a block diagram representing an exemplary computing device 900 that may be used to perform any of the methods provided by exemplary embodiments. The computing device 900 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. A distributed computational system may be provided comprising a plurality of such computing devices.

The computing device 900 includes one or more non-transitory computer-readable media having encoded thereon one or more computer-executable instructions or software for implementing exemplary methods. The non-transitory computer-readable media may include, but are not limited to, one or more types of hardware memory, non-transitory tangible media (for example, one or more magnetic storage disks, one or more optical disks, one or more USB flash drives), and the like. For example, memory 906 included in the computing device 900 may store computer-readable and computer-executable instructions or software for implementing exemplary embodiments. The computing device 900 also includes processor 902 and associated core 904, and in some embodiments, one or more additional processor(s) 902' and associated core(s) 904' (for example, in the case of computer systems having multiple processors/cores), for executing computer-readable and computer-executable instructions or software stored in the memory 906 and other programs for controlling system hardware. Processor 902 and processor(s) 902' may each be a single core processor or multiple core (904 and 904') processor.

Virtualization may be employed in the computing device 900 so that infrastructure and resources in the computing device may be shared dynamically. A virtual machine 914 may be provided to handle a process running on multiple processors so that the process appears to be using only one computing resource rather than multiple computing resources. Multiple virtual machines may also be used with one processor.

Memory 906 may include a computer system memory or random access memory, such as DRAM, SRAM, EDO RAM, and the like. Memory 906 may include other types of memory as well, or combinations thereof.

A user may interact with the computing device 900 through a visual display device 918, such as a screen or monitor, that may display one or more user interfaces 920 that may be provided in accordance with exemplary embodiments. The visual display device 918 may also display other aspects, elements and/or information or data associated with exemplary embodiments. The computing device 900 may include other I/O devices for receiving input from a user, for example, a keyboard or any suitable multi-point touch interface 908, a pointing device 910 (e.g., a mouse, a user's finger interfacing directly with a display device, etc.). The keyboard 908 and the pointing device 910 may be coupled to the visual display device 918. The computing device 900 may include other suitable conventional I/O peripherals.

The computing device 900 may include one or more audio input devices 924, such as one or more microphones, that may be used by a user to provide one or more audio input streams.

The computing device 900 may include one or more storage devices 924, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement exemplary embodiments as taught herein. For example, the storage device 924 may provide an interest determination module 206, a semantic analysis engine 208, a product encoding module 212, a product information stage device 214, a product determination module 216, and a product ranking module 218. The storage device 924 may be provided on the computing device 900 or provided separately or remotely from the computing device 900.

The computing device 900 may include a network interface 912 configured to interface via one or more network devices 922 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 912 may include a built-in network adapter, network interface card, PCMCIA network card, card bus network adapter, wireless network adapter, USB network adapter, modem or any other device suitable for interfacing the computing device 900 to any type of network capable of communication and performing the operations described herein. The network device 922 may include one or more suitable devices for receiving and transmitting communications over the network including, but not limited to, one or more receivers, one or more transmitters, one or more transceivers, one or more antennae, and the like.

The computing device 900 may run any operating system 916, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 916 may be run in native mode or emulated mode. In an exemplary embodiment, the operating system 916 may be run on one or more cloud machine instances.

One of ordinary skill in the art will recognize that exemplary computational system 900 may include more or fewer modules than those shown in FIG. 9.

Any of the electronic or programmable techniques described herein, such as, interest determination, semantic analysis, data gathering, and/or data processing techniques, may be implemented using any suitable means, including the systems, devices and methods taught in a U.S. non-provisional patent application Ser. No. 13/300,519 titled "Social Genome," filed Nov. 18, 2011, a U.S. non-provisional patent application Ser. No. 13/300,524 titled "Processing Data Feeds," filed Nov. 18, 2011, a U.S. non-provisional patent application Ser. No. 13/300,523 titled "Real-Time Analytics of Streaming Data," filed Nov. 18, 2011, U.S. patent application Ser. No. 13/106,706 titled "Processing Data Feeds," filed May 12, 2011, U.S. Provisional Patent Application No. 61/345,252 titled "Content Feed," filed May 17, 2010, and U.S. Provisional Patent Application No. 61/415,282 titled "Managing Real-Time Data Streams," filed Nov. 18, 2010, and U.S. Provisional Patent Application No. 61/415,279 titled "Social Genome," filed Nov. 18, 2010. The entire contents of the above-referenced applications are incorporated herein in their entirety by reference.

V. Exemplary Network Environments

Figure 10:
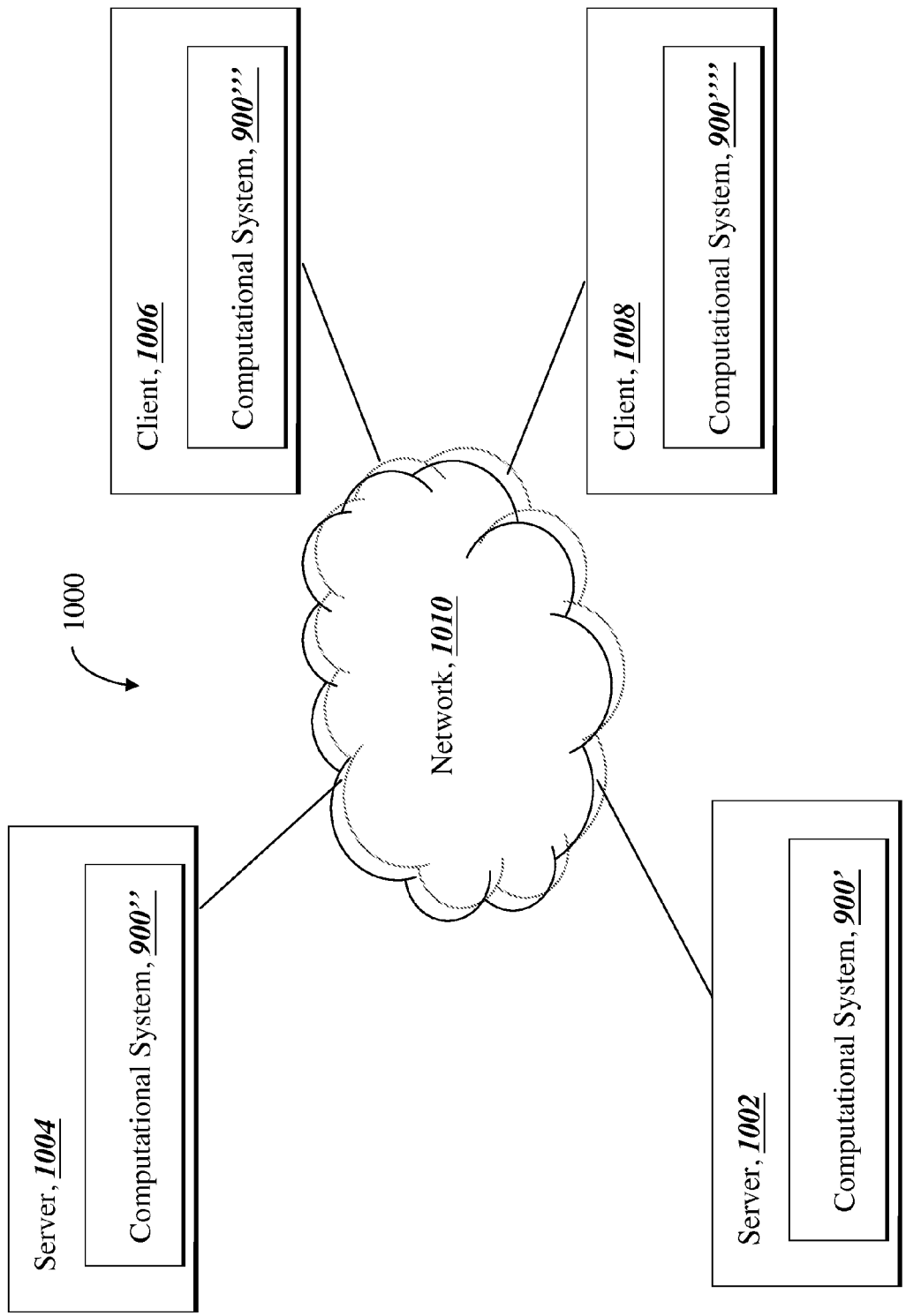
FIG. 10 is a block diagram representing an exemplary network environment suitable for a distributed implementation of exemplary embodiments.

FIG. 10 is a block diagram representing an exemplary network environment 1000 suitable for a distributed implementation of exemplary embodiments. The network environment 1000 may include one or more servers 1002 and 1004 coupled to one or more clients 1006 and 1008 via a communication network 1010. The network interface 912 and the network device 922 of the computing device 900 enable the servers 1002 and 1004 to communicate with the clients 1006 and 1008 via the communication network 1010. The communication network 1010 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 1010 are capable of supporting distributed implementations of exemplary embodiments.

In an exemplary embodiment, the servers 1002 and 1004 may provide the clients 1006 and 1008 with computer-readable and/or computer-executable components or products or data under a particular condition, such as a license agreement. In an exemplary embodiment, the clients 1006 and 1008 may provide the servers 1002 and 1004 with computer-readable and/or computer-executable components or products or data under a particular condition, such as a license agreement.

In an exemplary embodiment, one or more of the servers 1002 and 1004 and clients 1006 and 1008 may implement a computational system, such as system 900 or one or more modules thereof shown in FIG. 9, in order to provide a distributed mechanism for performing the exemplary methods described herein. For example, servers 1002 and 1004 may implement computational systems 900' and 900", respectively, and clients 1006 and 1008 may implement computational systems 900'" and 900"", respectively.

In an exemplary distributed implementation of a product recommendation system, a user of the recommendation system may use a computational system 900'" at a client 1006 (for example, a user interface of the recommendation system) to receive automatic recommendations of products for a selected individual. The computational system 900'" at the client 1006 may request for and receive textual content associated with the selected individual from a server 1002. In one example, the server 1002 may be maintained for a social networking website and may provide the client 1006 with data published by the selected individual on the social networking website.

Upon receiving the textual content, the computational system 900'" at the client 1006 may run a semantic analysis engine on the textual content to determine one or more topics of interest to the selected individual. Alternatively, the computational system 900'" at the client 1006 may forward the textual content to a semantic analysis engine provided at a different server for processing. The server may subsequently forward one or more topics of interest determined based on the textual content to the computational system 900'" at the client 1006.

In mapping the topics of interest to one or more suitable products, the computational system 900'" at the client 1006 may look up product information in a database housed at the client 1006 itself (for example, by running a product determination module 216 on a product information storage device 214 to determine one or more products, and by running a product ranking module 218 to rank the products). Alternatively, one or more of the product determination module 216, product ranking module 218 and product information storage device 214 may be provided at a computational system 900" of a server 1004. In one example, the computational system 900'" at the client 1006 may query a product information storage device 214 housed at the computational system 900" of the server 1004 for product information matching the one or more topics of interest. The server computational system 900" of the server 1004 may subsequently forward an ordered or unordered list of product recommendations to the user at the computational system 900'" of client 1006.

VI. Equivalents

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts. Method steps in the exemplary flowcharts represented in dashed lines are steps that are provided in some embodiments and not in other embodiments.

What is claimed is:

1. A computer-implemented method for recommending one or more gifts for a selected individual, the method comprising:
receiving, by an interest determination module, textual content authored and published by the selected individual;
forwarding the textual content to a semantic analysis engine;
performing, by the semantic analysis engine, semantic analysis on the textual content to extract one or more topic categories of interest to the selected individual from within the textual content;
receiving the one or more topic categories of interest from the semantic analysis engine;

determining, by a computing device executing computer-executable code associated with a product lookup module, one or more products corresponding to the one or more topic categories of interest that are giftable; and recommending the one or more giftable products as gifts for the selected individual;

wherein the semantic analysis of the textual content performed by the semantic analysis engine comprises:

determining that the selected individual has a negative sentiment of a first topic category among the one or more topic categories based on the textual content authored and published by the selected individual and received by the determination module; and, excluding the first topic category from the one or more topic categories of interest, the first topic category not utilized in the determining of the one or more products corresponding to the one or more topic categories of interest.

2. The computer-implemented method of claim 1, wherein the textual content comprises content authored and published by the selected individual on one or more web pages.

3. The computer-implemented method of claim 1, wherein the textual content comprises profile information on tweets authored and published by the selected individual.

4. The computer-implemented method of claim 1, wherein the one or more products are automatically determined by the product lookup module based on a product catalog corresponding to at least one of one or more particular stores and one or more particular geographical locations, wherein the particular geographical locations are associated with the selected individual.

5. The computer-implemented method of claim 1, wherein a plurality of gifts are recommended for the selected individual, and wherein the method further comprises:

using the semantic analysis engine to determine extract a plurality of topic categories associated with the plurality of products from within textual content discussing the plurality of products in sources of information on the Internet;

for each topic category, determining an affinity score of the selected individual to the topic category, the affinity score indicating a likelihood of the selected individual having interest in the topic category;

determining a ranking of the plurality of products in descending affinity scores of the selected individual to the topic categories associated with the plurality of products; and generating an ordered list of the plurality of products based on the ranking of the plurality of products.

6. The computer-implemented method of claim 5, wherein a first affinity score of the selected individual to a first topic category associated with a first product is determined based on one or more of the following: a number of occurrences of the first topic category in the textual content associated with the selected individual, a number of occurrences of the first topic category in textual content associated with a second individual who is associated with the selected individual, a number of occurrences of the first topic category in textual content associated with a plurality of individuals, and a time of a last occurrence of the first topic category in the textual content associated with the selected individual.

7. The computer-implemented method of claim 1, wherein a plurality of products are recommended as gifts for the selected individual, and wherein the method further comprises:

determining a plurality of giftability scores associated with the plurality of products, based on analysis of one or more characteristics of the products, each giftability score indicating a suitability of a corresponding product as a gift; and determining a ranking of the plurality of products in descending giftability scores associated with the plurality of products; and generating an ordered list of the plurality of products based on the ranking of the plurality of products.

8. The computer-implemented method of claim 1, wherein a plurality of gifts are recommended for the selected individual, and wherein the method further comprises:

using the semantic analysis engine to determine extract a plurality of topic categories associated with the plurality of products;

for each product in the plurality of products, determining extracting a number of topic categories of interest to the selected individual associated with the product from within textual content discussing the plurality of products in sources of information on the Internet;

determining a ranking of the plurality of products in descending numbers of topic categories associated with the plurality of products; and generating an ordered list of the plurality of products based on the ranking of the plurality of products.

9. The computer implemented method of claim 1, wherein the one or more products are determined based on one or more demographic characteristics of the selected individual.

10. A computational system, comprising:

a network communication device comprising an interest determination module, the interest determination module configured to:

receive textual content authored and published by a selected individual, and, forward the textual content to a semantic analysis engine;

a semantic analysis engine configured to:

perform semantic analysis on the textual content to extract one or more topic categories of interest to the selected individual from within the textual content, and, provide the one or more topic categories of interest from the semantic analysis engine to a product lookup module;

a product lookup module configured to determine one or more products corresponding to the one or more topic categories of interest that are giftable; and a processor configured to execute computer-executable code associated with the product lookup module to recommend, as gifts for the selected individual, the one or more products corresponding to the one or more topic categories of interest that are giftable;

wherein the semantic analysis engine is further configured to:

determine that the selected individual has a negative sentiment of a first topic category among the one or more topic categories based on the textual content authored and published by the selected individual and received by the determination module, and, exclude the first topic category from the one or more topic categories of interest, the first topic category not utilized in the determining of the one or more products corresponding to the one or more topic categories of interest.

11. The computational system of claim 10, wherein: the computational system is configured to recommend a plurality of gifts for the selected individual, the semantic analysis engine is programmed to extract a plurality of topic categories associated with the plurality of products from within textual content discussing the plurality of products in sources of information on the Internet, and the processor is further programmed to automatically execute computer-executable code programmed to:

for each topic category, determine an affinity score of the selected individual to the topic category, the affinity score indicating a likelihood of the selected individual having interest in the topic category;

determine a ranking of the plurality of products in descending affinity scores of the selected individual to the topic categories associated with the plurality of products; and generate an ordered list of the plurality of products based on the ranking of the plurality of products.

12. The computational system of claim 11, wherein a first affinity score of the selected individual to a first topic category associated with a first product is determined based on one or more of the following: a number of occurrences of the first topic category in the textual content associated with the selected individual, a number of occurrences of the first topic category in textual content associated with a second individual who is associated with the selected individual, a number of occurrences of the first topic category in textual content associated with a plurality of individuals, and a time of a last occurrence of the first topic category in the textual content associated with the selected individual.

13. The computational system of claim 10, wherein the computational system is configured to recommend a plurality of gifts for the selected individual, and wherein the processor is further programmed to:

determining a plurality of giftability scores associated with the plurality of products, based on analysis of one or more characteristics of the products, each giftability score indicating a suitability of a corresponding product as a gift; and determining a ranking of the plurality of products in descending giftability scores associated with the plurality of products; and generating an ordered list of the plurality of products based on the ranking of the plurality of products.

14. The computational system of claim 10, wherein: the computational system is configured to recommend a plurality of gifts for the selected individual, the semantic analysis engine is programmed to extract a plurality of topic categories associated with the plurality of products from within textual content discussing the plurality of products in sources of information on the Internet, and the processor is further programmed to:

for each product in the plurality of products, determine a number of topic categories of interest to the selected individual associated with the product;

determine a ranking of the plurality of products in descending numbers of topic categories associated with the plurality of products; and generate an ordered list of the plurality of products based on the ranking of the plurality of products.

15. The computational system of claim 10, wherein the one or more products are determined based on one or more connections among social elements identified by analyzing a plurality of data streams from multiple different social media services.

16. One or more non-transitory computer-readable media having encoded thereon computer-executable instructions configured to cause performance of a method for recommending one or more gifts for a selected individual, the method comprising:

receiving, by an interest determination module, textual content authored and published by the selected individual;

forwarding the textual content to a semantic analysis engine;

performing, by the semantic analysis engine, semantic analysis on the textual content to extract one or more topic categories of interest to the selected individual from within the textual content;

receiving the one or more topic categories of interest from the semantic analysis engine;

determining, by a computing device executing computer-executable code associated with a product lookup module, one or more products corresponding to the one or more topic categories of interest that are giftable; and recommending the one or more giftable products as gifts for the selected individual;

wherein the semantic analysis of the textual content performed by the semantic analysis engine comprises:

determining that the selected individual has a negative sentiment of a first topic category among the one or more topic categories based on the textual content authored and published by the selected individual and received by the determination module; and, excluding the first topic category from the one or more topic categories of interest, the first topic category not utilized in the determining of the one or more products corresponding to the one or more topic categories of interest.

17. The one or more computer-readable media of claim 16, wherein the method further comprises:

recommending a plurality of gifts for the selected individual;

using the semantic analysis engine to extract a plurality of topic categories associated with the plurality of products from within textual content discussing the plurality of products in sources of information on the Internet;

determining an affinity score of the selected individual to the topic category, the affinity score indicating a likelihood of the selected individual having interest in the topic category;

determining a ranking of the plurality of products in descending affinity scores of the selected individual to the topic categories associated with the plurality of products; and generating an ordered list of the plurality of products based on the ranking of the plurality of products.

18. The one or more computer-readable media of claim 17, wherein a first affinity score of the selected individual to a first topic category associated with a first product is determined based on one or more of the following: a number of occurrences of the first topic category in the textual content associated with the selected individual, a number of occurrences of the first topic category in textual content associated with a second individual who is associated with the selected individual, a number of occurrences of the first topic category in textual content associated with a plurality of individuals, and a time of a last occurrence of the first topic category in the textual content associated with the selected individual.

19. The one or more computer-readable media of claim 16, wherein the method further comprises:

recommending a plurality of products as gifts for the selected individual;

determining a plurality of giftability scores associated with the plurality of products, based on analysis of one or more characteristics of the products, each giftability score indicating a suitability of a corresponding product as a gift; and determining a ranking of the plurality of products in descending giftability scores associated with the plurality of products; and generating an ordered list of the plurality of products based on the ranking of the plurality of products.

20. The one or more computer-readable media of claim 16, wherein the method further comprises:

recommending a plurality of gifts for the selected individual;

using the semantic analysis engine to extract a plurality of topic categories associated with the plurality of products;

for each product in the plurality of products, extracting a number of topic categories of interest to the selected individual associated with the product from within textual content discussing the plurality of products in sources of information on the Internet;

determining a ranking of the plurality of products in descending numbers of topic categories associated with the plurality of products; and generating an ordered list of the plurality of products based on the ranking of the plurality of products.

21. The one or more computer-readable media of claim 16, wherein the one or more products are determined based on one or more connections among social elements identified by analyzing a plurality of data streams from multiple different social media services demographic characteristics of the selected individual.

* * * * *

UNITED STATES PATENT AND TRADEMARK OFFICE
CERTIFICATE OF CORRECTION

PATENT NO. : 8,725,592 B2  Page 1 of 1
APPLICATION NO. : 13/300473
DATED : May 13, 2014
INVENTOR(S) : Batra et al.

It is certified that error appears in the above-identified patent and that said Letters Patent is hereby corrected as shown below:

In the Claims

Col. 26 Claim 10 Line 29-64 should read
10. A computational system, comprising: a network communication device comprising an interest determination module, the interest determination module configured to: receive textual content authored and published by a selected individual, and, forward the textual content to a semantic analysis engine; a semantic analysis engine configured to: perform semantic analysis on the textual content to extract one or more topic categories of interest to the selected individual from within the textual content, and, provide the one or more topic categories of interest ~~from the semantic analysis engine~~ to a product lookup module; a product lookup module configured to determine one or more products corresponding to the one or more topic categories of interest that are giftable; and a processor configured to execute computer-executable code associated with the product lookup module to recommend, as gifts for the selected individual, the one or more products corresponding to the one or more topic categories of interest that are giftable; wherein the semantic analysis engine is further configured to: determine that the selected individual has a negative sentiment of a first topic category among the one or more topic categories based on the textual content authored and published by the selected individual and received by the determination module, and, exclude the first topic category from the one or more topic categories of interest, the first topic category not utilized in the determining of the one or more products corresponding to the one or more topic categories of interest.

Signed and Sealed this
Twenty-third Day of September, 2014

Michelle K. Lee
*Deputy Director of the United States Patent and Trademark Office*